United States Patent
Ackermann et al.

(10) Patent No.: US 6,839,656 B1
(45) Date of Patent: Jan. 4, 2005

(54) METHOD AND ARRANGEMENT FOR PREDICTING MEASUREMENT DATA BY MEANS OF GIVEN MEASUREMENT

(75) Inventors: Thomas Ackermann, Herzogenaurach (DE); Michael Greiner, Dachau (DE); Peter Liggesmeyer, Potsdam (DE); Oliver Maeckel, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/868,239

(22) PCT Filed: Dec. 10, 1999

(86) PCT No.: PCT/DE99/03955

§ 371 (c)(1),
(2), (4) Date: Aug. 7, 2001

(87) PCT Pub. No.: WO00/36426

PCT Pub. Date: Jun. 22, 2000

(30) Foreign Application Priority Data

Dec. 16, 1998 (DE) .......................... 198 58 093

(51) Int. Cl.⁷ .............................................. G06F 15/00
(52) U.S. Cl. .......................................... 702/181; 705/36
(58) Field of Search ............................ 702/34, 57, 58, 702/66–68, 70–71, 80, 81, 90, 118, 124, 181–186, 188; 705/10, 36

(56) References Cited

U.S. PATENT DOCUMENTS

| | | | |
|---|---|---|---|
| 4,979,118 A | * 12/1990 | Kheradpir | 701/117 |
| 5,726,907 A | * 3/1998 | Davidson et al. | 702/42 |
| 5,891,131 A | * 4/1999 | Rajan et al. | 606/5 |
| 6,061,662 A | * 5/2000 | Makivic | 705/36 |
| 6,477,471 B1 | * 11/2002 | Hedstrom et al. | 702/34 |
| 2001/0013008 A1 | * 8/2001 | Waclawski | 705/10 |

FOREIGN PATENT DOCUMENTS

| | | |
|---|---|---|
| DE | 195 30 647 | 1/1997 |
| DE | 196 10 847 | 4/1997 |
| EP | 0 786 725 | 7/1997 |

OTHER PUBLICATIONS

S. Yamada et al.; "Software Reliability Growth Modeling: Models and Applications"; IEEE Transaction on Software Engineering, vol. SE–11, No. 12, Dec. 1985, pp. 1431–1437.*

S. Yamada, et al.; "Software Reliability Growth Modeling: Models and Applications"; IEEE Transactions on Software Engineering, vol. SE–11, No. 12, Dec. 1985, pp. 1431–1437.

W.K. Ehrlich, et al.; "Application of Sofware Reliability Modeling to Product Quality and Test Process"; Proceedings of the International Conference on Software Engineering, US.; Los Alamitos, IEEE, Comp. Soc. Press. Bd. Conf. 12, 1990, pp. 108–116.

Anonymous: Stochastic Simulator of Software Development Process, Feb. 1978, IBM Technical Disclosure Bulletin, vol. 20, No. 9, Feb. 1978, pp. 3691–3692.

S.I. Resnick: "Adventure in Stochastic Processes", Birkhaeuser, Boston, 1992, ISBN 3–7643–3591–2, pp. 303–317.

P. Brately, et al "A Guide to Simulation" Springer Verlag, 2, Auflage, 1987, Chapter 4, Rational Choice of Input Distributions, pp. 124–191.

* cited by examiner

*Primary Examiner*—Marc S. Hoff
*Assistant Examiner*—Mohamed Charioui
(74) *Attorney, Agent, or Firm*—Morrison & Foerster LLP

(57) ABSTRACT

A method and an arrangement are provided for predicting measurement data using given measurement data, in which a stochastic process is matched to the given measurement data. Simulation runs are carried out from a given time-point until a final time-point. The forecast measurement data is determined for each simulation run. Measurement data for the final time-point is predicted within a range of values, which is determined by the forecast measurement data.

8 Claims, 4 Drawing Sheets

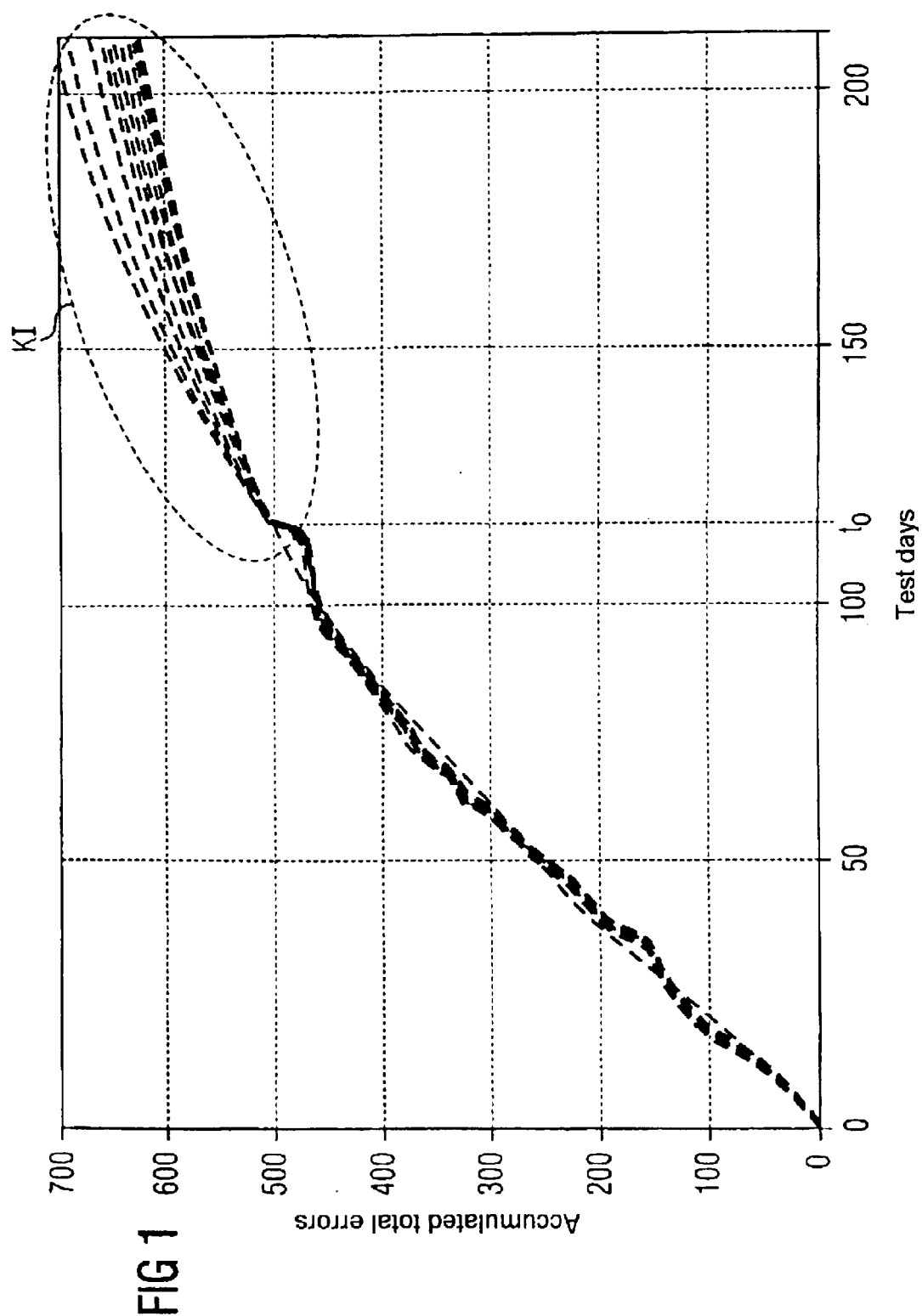

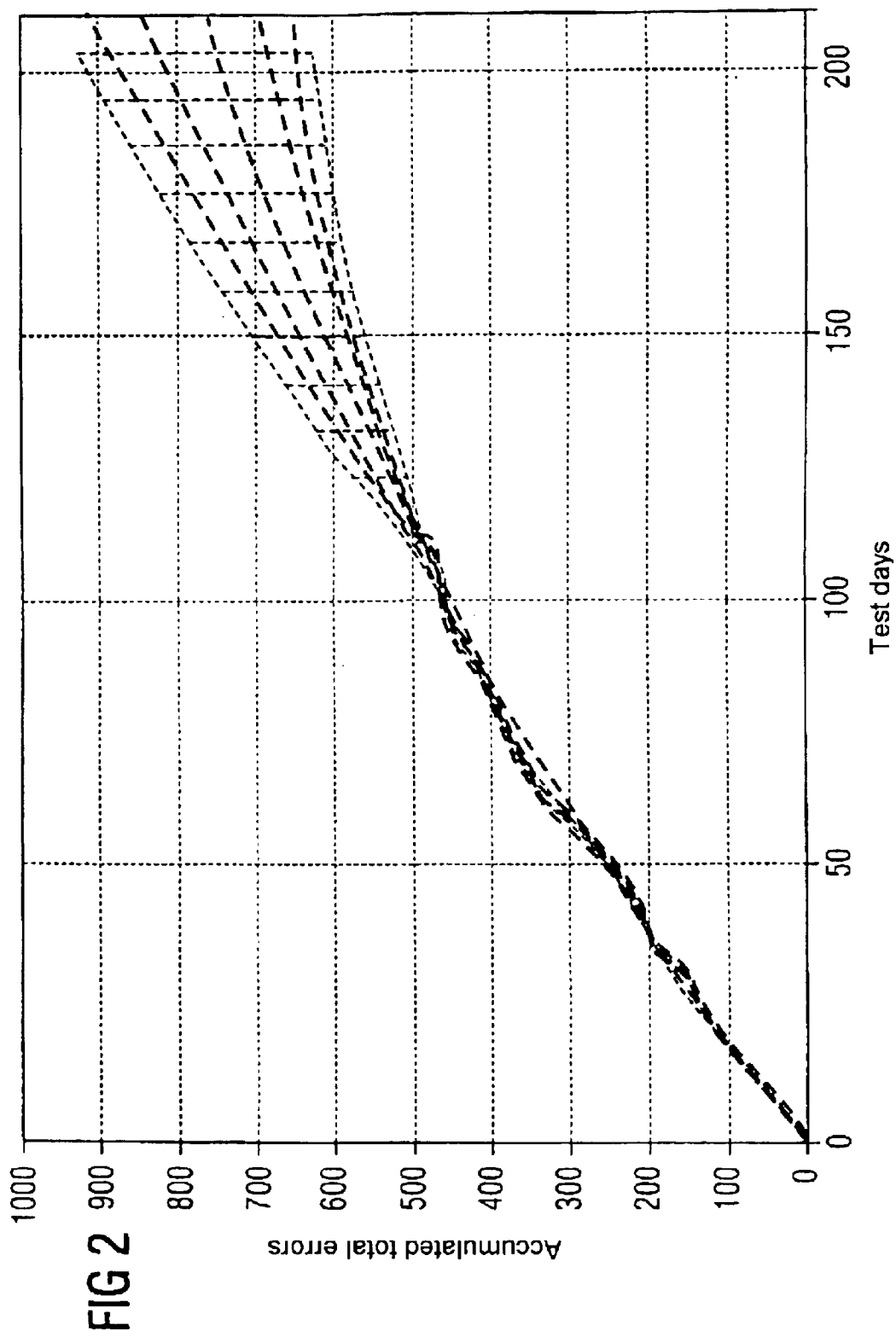

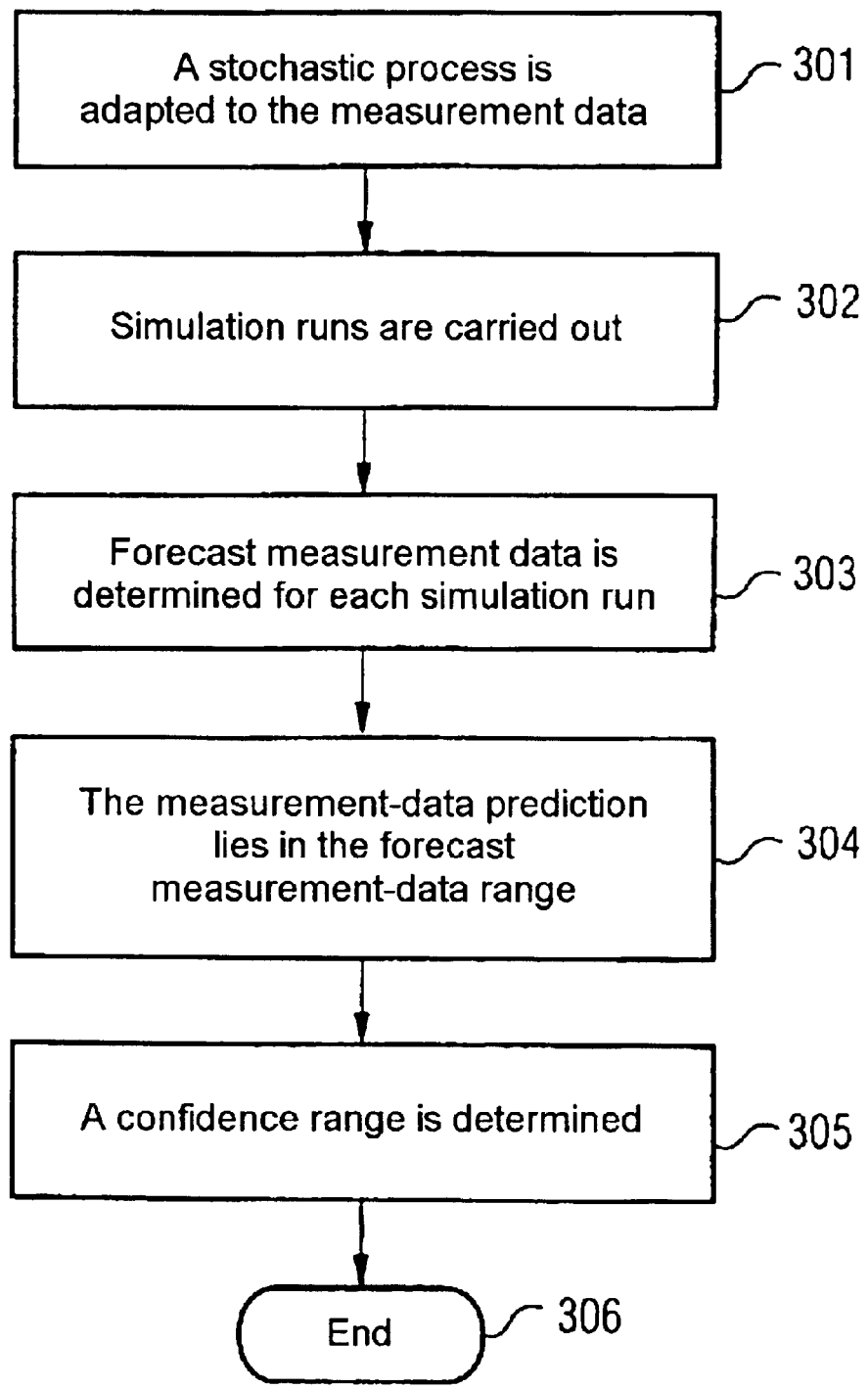

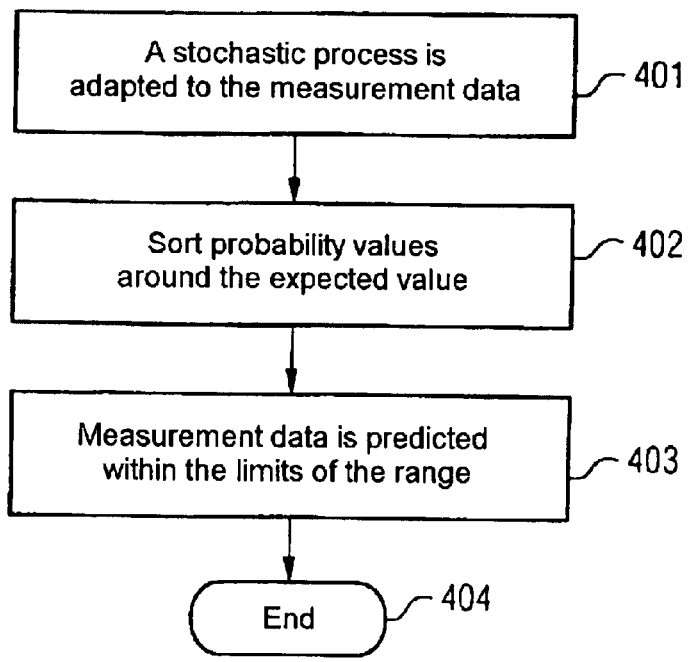
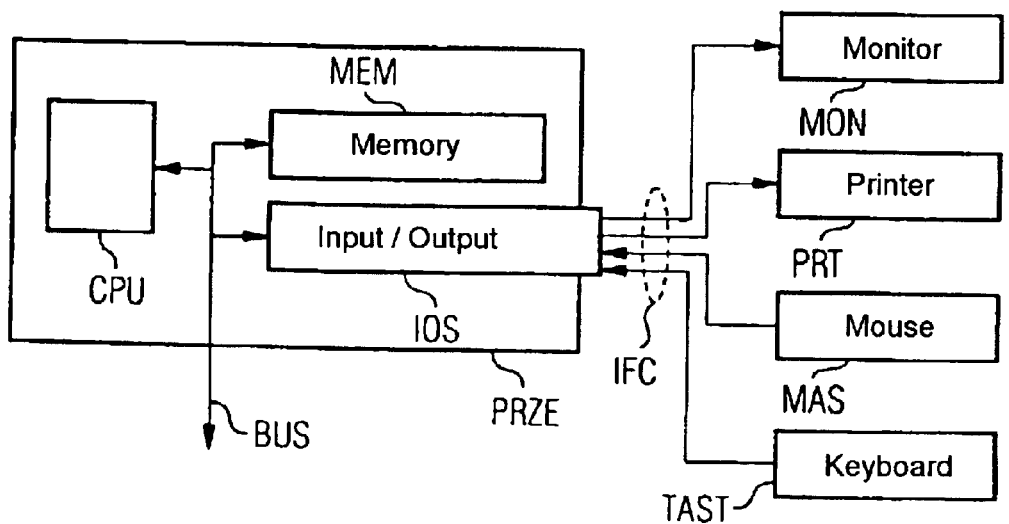

METHOD AND ARRANGEMENT FOR PREDICTING MEASUREMENT DATA BY MEANS OF GIVEN MEASUREMENT

BACKGROUND OF THE INVENTION

1. Field of the Invention

The invention relates to a method and arrangement for predicting measurement data using given measurement data.

2. Description of the Related Art

A technical system often requires facilities for forecasting based on known (measurement) data, particularly in the context of error susceptibility or cost estimates.

Forecasts generated by experts are generally subject to errors. Experts cannot carry out exact analyses, at least of highly complex systems.

A stochastic point process, in particular a Poisson process, is described in Sidney I. Resnick: "Adventures in Stochastic Processes", Birkhtäuser Boston, 1992, ISBN 3-7643-3591-2, pp. 303–317 (Resnick).

SUMMARY OF THE INVENTION

The object of the invention is to allow the automatic prediction (forecast) of measurement data using given measurement data.

This object is achieved in accordance with the method and apparatus described below; developments of the invention are also described in the following text.

In order to achieve this object, a method is provided for predicting measurement data using given measurement data, in which a stochastic process is matched to the given measurement data. Simulation runs are carried out from a given time-point until a final time-point. The forecast measurement data is determined for each simulation run. Measurement data for the final time-point is predicted within a range of values, which is governed by the forecast measurement data.

One development is to define a confidence range for the prediction of measurement data, where the a % lowest and b % highest forecast measurement data are eliminated. In particular, a % can equal b %. For example, a 95% confidence range can thus be defined by ignoring the 2.5% lowest and 2.5% highest forecast measurement data.

One advantage is that the measurement data can be predicted (forecast) with an accuracy that is within a confidence range, from a given time-point. This makes it possible to identify, e.g., the feasibility or impossibility of a task associated with the measurement data, at an early stage. Appropriate measures can therefore be initiated in order to counteract forecast impossibility.

This is particularly important in the case of a complex system, e.g., a software development process, where the extent to which a schedule can be followed before the software is completed can be shown in a subsequent test phase. Even more important in this context is the ability to adopt countermeasures at an early stage if a delay has been clearly identified, e.g., in an integration test phase. This firstly affects the feasibility of the specified deadline (timescale) and secondly directly affects costs, since noncompliance with the agreed timescale often results in additional costs.

One refinement is for the stochastic process to be a non-homogeneous Poisson process.

In particular, the measurement data may in one refinement comprise numbers of errors. This applies to software development, for example, where the level of maturity is documented in accordance with the errors measured in a test phase. Completion is directly dependent on this level of maturity. In other words, the software cannot be delivered to customers until most of the errors have been removed from the software. This is particularly important with regard to resources (required to test and correct errors) and costs (due to delayed delivery).

In order to achieve the object of the invention, a method is also provided for predicting measurement data using given measurement data, in which a stochastic process is matched to the given measurement data. A range is ascertained, by sorting the probability values generated by the stochastic process according to size, around an expected value. Measurement data is predicted on the basis of this range, and in particular the probability values within the range.

One development is for the probability values generated by the stochastic process to be sorted symmetrically by size around the expected value. In particular, this means that the highest probability value represents the middle of the range, i.e., the expected value, whereas the next highest probability value is arranged to the right or left of the expected value. The next highest probability value is then arranged symmetrically on the other side of the expected value, in turn.

This analytical (design) procedure provides a range, where the breadth of the range in turn indicates which probability values are significant in the prediction of the measurement data.

In one particular refinement, the breadth of the range is determined by ignoring the probability values that lie below a given threshold.

This produces a range (confidence range), which has a specific breadth as a result of the threshold. This breadth corresponds to the certainty with which the measurement data is predicted.

If one assumes that the stochastic process is a non-homogeneous Poisson process, then the non-homogeneous Poisson process defines a step size, particularly on a time axis t, which indicates when the next error will occur. One characteristic of the non-homogeneous Poisson process is that it has no memory, so that a "no-memory" search is carried out from each error that occurs at a specific time-point, for a time-point that indicates the next error.

In order to achieve the object of the invention, an arrangement is also provided for predicting measurement data using given measurement data that has a processor unit and is configured in such a way that:

a) a stochastic process can be matched to the given measurement data;

b) simulation runs can be carried out from a given time-point until a final time-point;

c) the forecast measurement data can be determined for each simulation run; and d) the prediction of measurement data for the final time-point can be predicted within a range of values, which is determined by the forecast measurement data.

In order to achieve the object of the invention, an arrangement is further provided for predicting measurement data using given measurement data that has a processor unit and is configured in such a way that:

a) a stochastic process can be matched to the given measurement data;

b) a range can be ascertained by sorting probability values generated by the stochastic process according to size around an expected value; and c) the measurement data is predicted within the limits of the range.

The arrangements are particularly suitable for carrying out the inventive method or the developments described above.

BRIEF DESCRIPTION OF THE DRAWINGS

Exemplary embodiments of the invention are shown and explained below with reference to the drawings, in which:

FIG. 1 is a graph showing an accumulated number of errors over a test period;

FIG. 2 is a graph showing the superimposed confidence ranges for different process models;

FIG. 3 is a flowchart showing the steps in a method for predicting measurement data using given measurement data;

FIG. 4 is a further flowchart showing the steps in a method for predicting measurement data using given measurement data; and FIG. 5 is a block diagram showing a processor unit.

DETAILED DESCRIPTION OF THE INVENTION

In order to be able to forecast a number of expected errors in a technical process, e.g., in a software development process, non-homogeneous Poisson processes (NHPP) are calibrated (i.e., matched to measurement data, such as the occurrence of errors over time) as follows:

The following equation describes a counting process associated with the stochastic point process (non-homogeneous Poisson process):

$$\{N(t)\}_{t \in R^+} \quad (1)$$

and a time-point $t_0$ defines the end of a test period, i.e., a time-point at which the given data ends. The stochastic processes $$\{U(t)\}_{t \in R^+} \text{ and} \quad (2)$$

$$\{O(t)\}_{t \in R^+} \quad (3)$$

are searched with $$p(U(t) \leq N(t) - N(t_0) \leq o(t) | N(t_0) = n_0) \geq \alpha \quad (4)$$

for all time-points where $t > t0$ and given values $\alpha \in (0.1)$ (confidence level) and $n0 \in N$. In particular, the following text examines the increases in the stochastic countings process in relation to the time-point $t_0$.

In the present case, where equation (1) represents a non-homogeneous Poisson process, the following equation (cf. Resnick)

$$P(N(t_1) - N(t_0) = l) = \exp(-[i(t_1) - i(t_0)]) \cdot \frac{[i(t_1) - i(t_0)]^l}{l!} \quad (5)$$

applies for $$0 \leq t_0 < t_1 > \infty, \ l \in N_0 \quad (6)$$

and an intensity (mean measure, mean value function) of $$i: R^+ \to R^+, t | \to i(t) = EN(t) \quad (7)$$

Since the nature of the Poisson process dictates that the increases (error increases in this case) are independent of previous increases, equation (5) for the time-points $t > t_0$ to define a (minimum) range $$[g_u, g_o] = [g_u(t), g_o(t)] \subset N_0 \quad (8)$$

can be simplified to $$\sum_{l=g_u}^{g_o} p(N(t) - N(t_0) = l) \geq \alpha. \quad (9)$$

Due to the unimodal nature of the Poisson count density, a range $[g_u, g_o]$ can be determined as follows:

Step 1: Sort the elementary probabilities $$pl := P(N(t) - N(t_0) = l), \ l \in N_0$$

into descending order and label the values sorted thus using $p_{(0)}, p_{(i)}, \ldots$ (i.e. $\{p_0 p_1, \ldots\} = \{p_{(0)}, p_{(i)}, \ldots\}$ and $p_{(0)} \geq p_{(1)} \geq \ldots$);

Step 2:

$$\text{Determine } l_{min} := \min\left\{ l \in N_0 \middle| \sum_{i=0}^{l} P(i) \geq \alpha \right\};$$

Step 3: Determine an index set $I := \{i_0, \ldots, i_{l_{min}}\} \subset N_0$ where
$\{pi_0, \ldots, pi_{l_{min}}\} = \{p_{(0)}, \ldots, p_{(l_{min})}\}$;

Step 4: Substitute $$g_u := \min_{i \in I}\{i\} \text{ and } g_o := \max_{i \in I}\{i\}.$$

The range from equation (8) is also referred to as the forecast range.

Stochastic Simulation (second approach)

It is possible to determine the confidence range described using simulation, with the following steps:

Step 1: Start independent simulation runs based on the selected process model at time-point t0 of the last error message $m \in N$;

Step 2: End a simulation run as soon as the required final time-point $t_e$ is reached;

Step 3: Repeat Step 2 until all simulation runs are finished;

Step 4: Sort the numbers $\hat{N}_i(t_e)$ of the errors generated in the i-th simulation run in the time period $(t_0, t_e)$, i=1, ..., m, in descending order, and label the values sorted thus $\hat{N}_{(1)}(t_e), \ldots, \hat{N}_{(m)}(t_e)$; and Step 5: Substitute $\hat{g}_u := \hat{N}_{(\lfloor m \cdot \alpha/2 \rfloor)}(t_e)$ and
$\hat{g}_u := \hat{N}_{(\lfloor m \cdot (1-\alpha/2) \rfloor)}(t_e)$,
i.e., eliminate the $(100 \cdot (1-\alpha)/2)$ % lowest and highest values.

This produces the confidence range directly.

Each individual simulation run is based on a simulation algorithm, which is known from (cf. Brately, et al., 1987):

The simulated generation of intermediate arrival times for a non-homogeneous Poisson process is as follows:

Step 1: Substitute $$\bar{\lambda} := \sup_{t \geq t_s}\{\lambda(t)\},$$

$$\lambda(t) := \left.\frac{di}{dt}\right|_t. \quad (10)$$

Step 2: Generate a (pseudo) random variable X that is exponentially distributed with the parameter $\bar{\lambda}$, i.e., x :=−log (U)/$\bar{\lambda}$, where U is equally distributed over (0,1);

Step 3: Generate a random variable U that is equally distributed over (0,1); and Step 4: If U≦$\lambda(t_s+x)/\bar{\lambda}$, then substitute t=$t_s$+X; otherwise substitute $t_s$=$t_s$+X and go to Step 1.

The example graph in FIG. 1 shows an accumulated number of errors during a given test period. From time-point $t_0$, it shows a prediction range Kl for all time-points $t_0$+x.

The intensity i is normally derived from equation (10) for $\lambda$. For example the result is as follows:

a) $\lambda(t) = a \cdot b \cdot c \cdot \exp(-bt^c) \cdot t^{c-1}$ ($\lambda(t)$ is strictly monotonously descending for c≦1, and unimodal for c>1 with a definitive maximum at a point $$t_{max} = \sqrt[c]{\frac{c-1}{bc}}\right).$$

b) Otherwise, $\bar{\lambda}$ is derived in accordance with the above is comments as follows:

$$\bar{\lambda} = \begin{cases} \lambda(t_s), & (c \leq 1) \vee (t_s \geq t_{max}) \\ \lambda(t_{max}) \end{cases}.$$

The graph in FIG. 2 shows the superimposed confidence ranges. In particular, this illustrates that possible forecasts become more scattered the further they extend into the future. In particular, confidence ranges calculated using different process models can be demonstrated in the same way as shown in FIG. 2.

FIG. 3 shows a flowchart for the steps of a method for predicting measurement data using given measurement data. In Step 301, a stochastic process, in particular a non-homogenous Poisson process (to represent a stochastic count process), is matched to given measurement data. In Step 302, simulation runs are run from time-point $t_0$ to a final time-point $t_e$ that is to be forecast. In Step 303, for each simulation run, forecast measurement data is determined and a prediction of measurement data is restricted to a range which is covered by the measurement data determined by the simulation runs (see Step 304). In Step 305, a confidence range is determined in which a given proportion of the lowest and highest forecast measurement data is ignored in each case (this corresponds to the aforementioned range). The method terminates in Step 306.

FIG. 4 shows a further flowchart for the steps of a method for predicting measurement data using given measurement data. In Step 401, a stochastic process, in particular a non-homogenous Poisson process, is matched to the given measurement data. Probability values are determined using the stochastic process, and these are sorted according to size around an expected value (see Step 402). This sort operation results in the definition of a range, namely a confidence range in this case. The breadth of the confidence range is determined by comparing the accumulated probabilities with a given threshold. As described above, the confidence range gives a distribution or uncertainty, respectively, of a time-point to in the future, which allows the measurement data to be estimated in the future (see Step 403). The method terminates in Step 404.

FIG. 5 shows a processor unit PRZE that may be used to implement the inventive method. The processor unit PRZE comprises a processor CPU, a memory unit MEM, and an input/output interface IOS, which is used in different ways via an interface IFC: a graphics interface allows output to be viewed on a monitor MON and/or output to a printer PRT. Inputs are entered via a mouse MAS or a keyboard TAST. The processor unit PRZE also includes a data bus BUS, which provides the connection between a memory unit MEM, the processor CPU and the input/output interface IOS. It is also possible to connect additional components to the data bus BUS, e.g. additional memory, data storage (hard disk) or scanner.

The C programming language is used in the following examples, which show an algorithm to define confidence ranges for forecasts and an algorithm for simulated definition of confidence ranges for forecasts.

Program 1:

/* Definition of confidence ranges for forecasts */
/* based on the generalized Goel-Okomoto model */

```
#include <stdlib.h>
#include <math.h>
#include <stdio.h>
#define true 1
#define false −1
double mv__genGO(double,double,double,double): double poisson(double,long): void ki__nhpp( ):
int main(argc,argv)
int argc;
char *argv[ ];
{
double a,b,c,bt,st,kn;
long low,upp,lauf;
if (argc<7) {
print("\n\nZuwenig Argumente! \n\n");
print("Aufruf: %s <Par1> <Par2> <Par3> <Startzeit> <Endzeit>",
"<KNiveau>\n\n", argv[0]); return 1;
}
a = atof(argv[1]);
b = atof(avgv[2]);
```

```
c = atof(argv[3]);
bt=atof(argv[4]);
st= atof(argv[5]);
kn= atof(argv[6]);
for (lauf=1;lauf< ;lauf++) {
ki_nhpp(mv_genGO,a,b,c,bt,bt+lauf*(st-bt)/10.,kn,&low,&upp);
printf("Zertpunkt: %8.2f    Fehlerintervall: [%d,%d]\n",
bt+lauf*(st-bt/10., low, upp);
    }
return 0:
}
double mv_genGO(x,a,b,c)
double x,a,b,c;
{ return( a*(1.0-exp(-b*pow(x,c))) ); )
double poisson(lambda,wert)
double lambda;
long wert;
{
long i;
double itval,hv;
if (lambda<600) {
itval = exp(-lambda):
for (i=wert;i>=1;i--) { itval *= lambda/(double)i; }
    }
else {
hv = exp(-lambda/(double)wert);
itval = 1.0;
for (i=wert;i>=1;i--) { itval *= lambda/(double)i*hv; }
    }
return ( itval );
}
void ki_nhpp(mv_nhpp, par1_nhpp, par2_nhpp, par3_nhpp,
    start_time, stop_time, k_niveau, lower, upper) double mv_nhpp(double,double,double,double);
        double par1_nhpp, par2_nhpp, par3_nhpp, start_time, stop_time, k_niveau; long *lower, *upper;
{
long lauf;
int lborder,mod_low,mod_upp;
double sum,tmp_mv, val_l, val_u;
tmp_mv = mv_nhpp(stop_time,par1_nhpp.par2_nhpp,par3_nhpp) -
mv_nhpp(start_time,par1_nhpp,par2_nhpp,par3_nhpp); lauf = (long)tmp_mv;
*lower = lauf-1;
*upper = lauf+1; mod_low= false; mod_upp= false; sum = poisson(tmp_mv,lauf); val_l =
    poisson(tmp_mv, *lower); val_u = poisson(tmp_mv,*upper);
while (sum<k_niveau) {
if (val_i<val_u) {
sum += val_u;
(*upper)++;
lborder = false;
mod_upp = true;
val_u = poisson(tmp_mv,*upper);
    }
else {
sum += val_l;
(*lower)--;
lborder = true;
mod_low = true;
val_l = poisson(tmp_mv,*lower);
    }
    }
if (lborder == true) { (*lower)++; }
else       {(*upper)--;)
if (mod_low == false) { (*lower)++; }
if (mod_upp == false) { (* upper)--; }
return:
}
```

Program 2:
/* Simulated definition of confidence ranges for forecasts
*/

/* based on the generalized Goel-Okomoto model */

```c
#include <stdlib.h>
#include <math.h>
#include <time.h>
#include <stdio.h>
#include <values.h>
#define true 1
#define false -1
double drand48(void);
void srand48(long);
double sim_exp(double); double lambda_genGO(double,double,double,double); void sim_nhpp( );
int main(argc,argv)
int argc;
char *argv[];
{
time_t t; double a,b,c,bt,st,pnt[1000000],check_time[12]; long lauf,no_pnt,seed_run; int clauf;
FILE *datei:
if (argc<6) {
printf("\n\nZuwenig Argumente! \n\n");
printf("Aufruf. %s <Par1> <Par2> <Par3> <Startzeit> <Endzeit>\n\n",
argv[0]; return 1;
}
datei = fopen("sim.seed","r");
if (datei==NULL) {
seed_run = 1;
}
else {
fscanf(datei,"%8", &seed_run); fclose(datei); seed_run++;
}
datei = fopen("sim.seed","w+");
fprintf(dtei, "%6d\n", seed_run );
fclose(datei);
time (&t);          /* initialisierung des  */
t += seed_run*100;        /* Zufallszahlengenerators */
srand48 ((unsigned long) t) ; /* mit Hilfe der Systemzeit */
a = atof(argv[1]);
b = atof(argv[2]);
c = atof(argv[3]):
bt= atof(argv[4]):
st= atof(argv[5]);
sim_nhpp(lambda_genGO,a,b,c,bt,st&pnt,&no_int);
for (lauf=1;lauf<=no_pnt;lauf++) {
printf("%15.7f % 10d \n", pnt[lauf], lauf);
    }
```

```c
datei = fopen("ki.tmp","a");
for (lauf=1;lauf< ;lauf++) {
check_time[lauf] = bt+lauf*(st-bt)/10.;
    }
check_time[11] = pnt(no_pnt]+1; /* groBer als die groBte
simulierte Zeit */
clauf = 1;
for (lauf= 1;lauf<=no_pnt;lauf++) {
while (pnt[lauf])>=check_time[clauf]) { fprint(datei, "%8.2f %6d ", check_time[clauf], lauf-1); clauf++;
    }
  }
if (pnt[no_pnt] <check_time[10]) {
for (lauf=clauf,lauf< ;lauf++) { fprint(datei, "%8.2f %6d ", check_time[lauf], no_pnt);
    }
  }
fprintf(datei. "\n");
fclose(datei);
return 0;
}
double sim_exp(lambda)
double lambda;
{return( -log(dand48( ))/lambda ); }
double lambda_genGO(x,a,b,c)
double x,a,b,c;
```

-continued

```
{ return( a*b*c*pow(x,c-1)*exp(-b*pow(x,c)) ); }
void sim_nhpp(lamba_nhpp, par1_nhpp, par2_nhpp, par3_nhpp,
start_time, stop_time, path, no_points) double lambda_nhpp(double,double,double,double); double
    par1_nhpp, par2_nhpp, par3_nhpp, start_time, stop_time; double path[]; long *no_points;
{
double sim_time,x,u,x_bar,lambda_bar;
*no_points=0;
sim_time = start_time;
do (
if (par3_nhpp<=1) { lambda_bar = lambda_nhpp(sim_time,par1_nhpp,par2_nhpp,par3_nhpp);
    }
else {
x_bar = pow((par3_nhpp-1.0/par2_nhpp/par3_nhpp,1.0/par3_nhpp);
if (sim_time>=x_bar) {
lambda_bar = lambda_nhpp(x_bar,par1_nhpp,par2_nhpp,par3_nhpp);
    }
else {
lambda_bar = lambda_nhpp(sim_time,par1_nhpp,par2_nhpp,par3_nhpp);
    }
    }
x = sim_exp(lambda_bar);
u = drand48( );
    if (u<=lambda_nhpp(sim_time+x,par1_nhpp,par2_nhpp,par3_nhpp)/lambda_bar) {(*no_points)++;
        path[*no_points]=sim_time+x;
        }
    sim_time+=x;
    }
    while (sim_time<=stop_time);
    return;
    }
```

Program 3:     30
    /*Definition of confidence ranges from the simulation
        data */
    /*(the simulation data is sorted into ascending order) */

```
#include <stdlib.h>
#include <math.h>
#include <stdio.h>
int qsort_icmp(int*,int*);
int qsort_icmp(x,y)
int *x, *y;
{
if (*x<*y)     { return ( -1 ); )
else if (*x==*y) { return ( 0 ); }
else       { return( 1 ); }
}
int main(argc,argv)
int argc;
char *argv[];
{
int pnt[11][100000];
int qs[100000];
char *dname;
int frac,i;
long lauf,lower_bound,upper_bound;
long l,no_pnt,seed_run;
double ctime[11],x;
FILE *datei;
if (argc<3) {
printf("\n\nZuwenig Argumente! \n\n"); print("Aufruf: %s <Dateiname> <Konfidenzniveau (in
        %%)>\n\n", arg[0]); return 1;
    }
dname = argv[1];
frac = 100-atoi(argv[2]);
lauf = 0;
datei = fopen(dname,"r");
if (datei==NULL) { return 1; }
else {
while (!feof(datei)) {
lauf++;
for (i=1;i<=9;i++) {
```

-continued

```
fscanf(datei,"%8lf %6d ", &ctime[i], &pnt[i][lauf]);
     }
fscanf(datei,"%8lf %6d \n", &ctime[10], &pnt[10][lauf]);
     }
fclose(datei);
     }
lower_bound = (long)floor(lauf*frac/200.); upper_bound = (longceil(lauf*(200.-frac)/200.);
if (lower_bound<1) {lower_bound = 1;}
```

```
printf("\n\n%2d%%-Sicherheitsbereich bei %d Simulationslaufen\n\n",
100-frac,lauf);
for (i=1;i< ;i++) {
for (l= 1;l<=lauf,l++) {
qs[l] = pnt[l][l];
     }
qsort(&qs[1], lauf, sizeof(int), &qsort_icmp);
printf("Zeitpunkt; %8.2f Fehlerintervall: [%d,%d]\n",
ctime[i], qs[lower_bound], qs[upper_bound]);
     }
return 0;
}
```

The above-described method and apparatus are illustrative of the principles of the present invention. Numerous modifications and adaptations will be readily apparent to those skilled in this art without departing from the spirit and scope of the present invention.

What is claimed is:

1. A method for predicting measurement data until a final time-point using given measurement data, comprising:

matching, using a processor, a stochastic process to said given measurement data;

running simulation runs of said stochastic process from a given time-point until said final time-point;

determining forecast measurement data for each simulation run;

predicting measurement data by stating a range of values, which is determined by said forecast measurement data, and providing said predicted measurement data as useable output;

determining a confidence range for said prediction of measurement data; and eliminating a lowest percentage and a highest percentage forecast measurement data.

2. The method as claimed in claim 1, wherein the lowest and highest percentages are equal values.

3. The method as claimed in claim 1, wherein said stochastic process is a non-homogeneous Poisson process.

4. The method as claimed in claim 1, wherein said measurement data represents numbers of errors.

5. A method for predicting measurement data using given measurement data, comprising:

matching, using a processor, a stochastic process to said given measurement data;

sorting probability values generated by said stochastic process according to size, to provide a range around an expected value; and predicting measurement data within limits of said range, and providing said predicted measurement data as useable output; and determining a confidence range for said prediction of measurement data; and eliminating a lowest percentage and a highest percentage forecast measurement data.

6. The method as claimed in claim 5, further comprising:

sorting said probability values generated by said stochastic process symmetrically by size around said expected value.

7. An arrangement for predicting measurement data until a final time-point using given measurement data, comprising:

a processor unit, having a CPU, bus, memory, and input/output controller, configured in such a way that:

simulation runs of the stochastic process can be carried out from a give time-point until the final time-point;

forecast measurement data can be determined for each simulation run; and measurement data is predicted by stating a range of values, which is determined by said forecast measurement data, said measurement data being output in a useable form; and a confidence range for said prediction of measurement data is determined; and a lowest percentage and a highest percentage forecast measurement data are eliminated.

8. An arrangement for predicting measurement data using given measurement data, comprising:

a processor unit, having a CPU, bus, memory, and input/output controller, configured in such a way that:

a stochastic process can be matched to the given measurement data;

a range can be ascertained by sorting probability values generated by said stochastic process according to size around an expected value; and said measurement data is predicted within the limits of the range, said measurement data being output in useable form; and a confidence range for said prediction of measurement data is determined; and a lowest percentage and a highest percentage forecast measurement data are eliminated.

* * * * *